though in practice it has been found that the process is practical for batch operation. The process is particularly suited to the commercial conditions.

United States Patent Office
3,106,449
Patented Oct. 8, 1963

3,106,449
PRODUCTION OF AMMONIUM HYDROGEN FLUORIDE
Frederick T. Fitch, Baltimore, Md., assignor to W. R. Grace & Co., New York, N.Y., a corporation of Connecticut
Filed July 17, 1961, Ser. No. 124,430
2 Claims. (Cl. 23—88)

This invention relates to a practical method of producing ammonium bifluoride from ammonium fluoride. In one particular aspect, it relates to a cyclic process for producing ammonium bifluoride which depends on the evaporation of solutions at predetermined temperatures.

It is well known that when ammonia and hydrogen fluoride are brought together in the proportion of one mole of ammonia to two moles of hydrogen fluoride, under proper conditions, solid ammonium bifluoride is produced.

The present invention provides a steady state evaporation process for the production of ammonium bifluoride from ammonium fluoride whereby the vaporous by-products are reacted with fluosilicic acid, and recycled to the initial step. The product is crystallized from the evaporated solution, and the mother liquor is recycled to the evaporator.

The essence of my invention resides in obtaining continuous controlled evaporation permitting the crystallization recovery in a cyclic process with complete product recovery. The steps inherent in the process are discussed below.

The key to the process is an understanding of the relationships governing the controlled decomposition of ammonium fluoride by evaporation and using these conditions in a continuous manner to provide a concentrated ammonium fluoride-ammonium bifluoride solution suitable for crystallization of the prodct and recycle of the mother liquor.

Ammonium fluoride solutions lose ammonia on evaporation to form ammonium bifluoride. The ammonia content of the distillate depends upon evaporation conditions. It increases rapidly with salt concentration but decreases rapidly with decreasing ammonium fluoride salt mol ratio.

Figure 1:
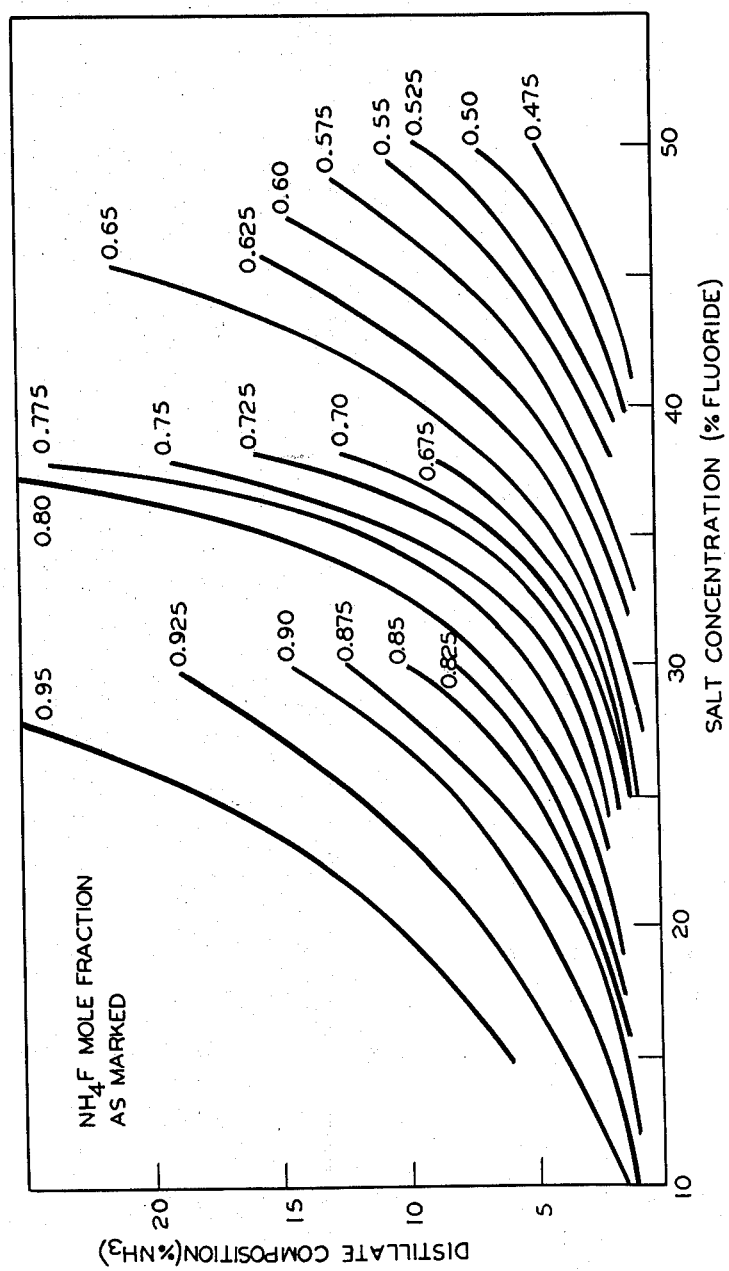
Figure 2:
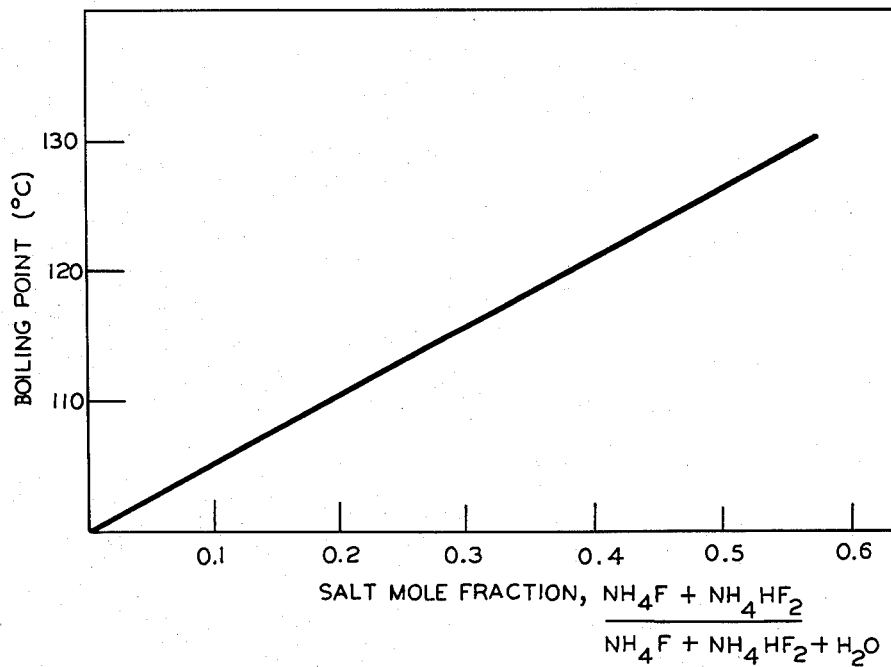

These relationships are shown in FIGURE 1, which is a graphical presentation of the data obtained in a number of runs in which the distillate ammonia composition is plotted against the percent fluoride concentration for various ammonium fluoride salt mole fractions. With the data of FIGURE 1, the decomposition of ammonium fluoride on evaporation by boiling at atmospheric pressure can be related to solution composition. For example, the distillate ammonia content from a 40% fluoride solution would be about 1%, 2.5%, 5.5% ammonia at 0.50, 0.55, and 0.60 ammonium fluoride salt mole fractions respectively. These values demonstrate that the rate of ammonia evolution is very sensitive to solution composition. The boiling point of the concentrated ammonium fluoride solution is also very sensitive to composition as shown in FIGURE 2, which relates boiling point to composition for these concentrated ammonium fluoride-ammonium bifluoride solutions. It is apparent from this figure that the evaporation in a continuous manner of ammonium fluoride solution at a fixed temperature will maintain a corresponding fixed composition. Maintaining a fixed temperature is critical to the process to control solution compositions.

For an effective ammonium bifluoride recovery from ammonium fluoride solution, the evaporation must remove stoichiometric quantities of ammonia with the water and yield solutions which permit an effective recovery of pure ammonium bifluoride by crystallization. The above requirements are met by the continuous steady-state evaporation system maintaining constant temperature by the continuous addition of ammonium fluoride solution and the recycled mother liquor solutions and the removal of evaporated solutions, all at the required rates. This method of operation permits conditions in performance for the evaporation that cannot be obtained in batch operation.

Evaporation at a fixed temperature within the range of 125–135° C. generally results in solution compositions permitting satisfactory ammonium bifluoride recoveries by crystallization. When a 20% ammonium fluoride solution is treated, for example, the evaporation condition should desirably be at least 44% fluoride concentration. The ammonium fluoride salt mole fraction is maintained at about 0.55 at 126–127° C. The yield per cycle would be improved, for example, if the evaporation conditions were set to maintain a temperature of 131 to 132° C. so that the fluoride concentration of the solution would be about 50% and the ammonium fluoride salt mol fraction about 0.47.

The boiling point of these concentrated ammonium fluoride-ammonium bifluoride solutions is quite sensitive to salt concentration and mole ratio, and varies from 110 to 135° C. with salt concentrations, in percent fluoride, of from 20 to 50%.

The crystallization step of my invention is illustrated by reference to FIGURE 3, which is a phase diagram of the ammonium fluoride-ammonium bifluoride-water system. Important areas in the diagram which form the basis of this invention are points C and the area C, D, E. The point C is the point where the solution composition is unchanged by crystallization, that is the ammonium fluorides will crystallize out with the same mole ratio as that in solution. This is at 0.747 ammonium fluoride salt mole fraction where the water to salt mole ratio is 1.872. The area covered by the points C, D, E is the area where the composition of the solution will crystallize out pure ammonium bifluoride. This area defines the broad limits of the operable crystallization range of my invention. Thus translated into terms of mole ratios, this area covers ammonium fluoride salt mole ratios from 0.0 to 0.747 where the water to salt mole ratio is in the range of 0.0 to 4.0. Such broad limits naturally include certain areas where crystallization recovery is poor or negligible.

In the area close to the point C (at 0.747 mole of ammonium fluoride), the product on crystallization is pure but the yield is extremely low. Preferred limits cover ammonium fluoride salt mole ratios of 0.4 to 0.6, where the mole ratio of water to salt lies between 1.0 and 2.0 (1.5 to 2.0 at the 0.6 ratio and 1.0 to 2.0 at the 0.4 ratio). This area is defined in the drawing as the area in FGHI. The product recovered from this range of operation is pure and can be recovered in good yield per pass in the system.

Figure 3:
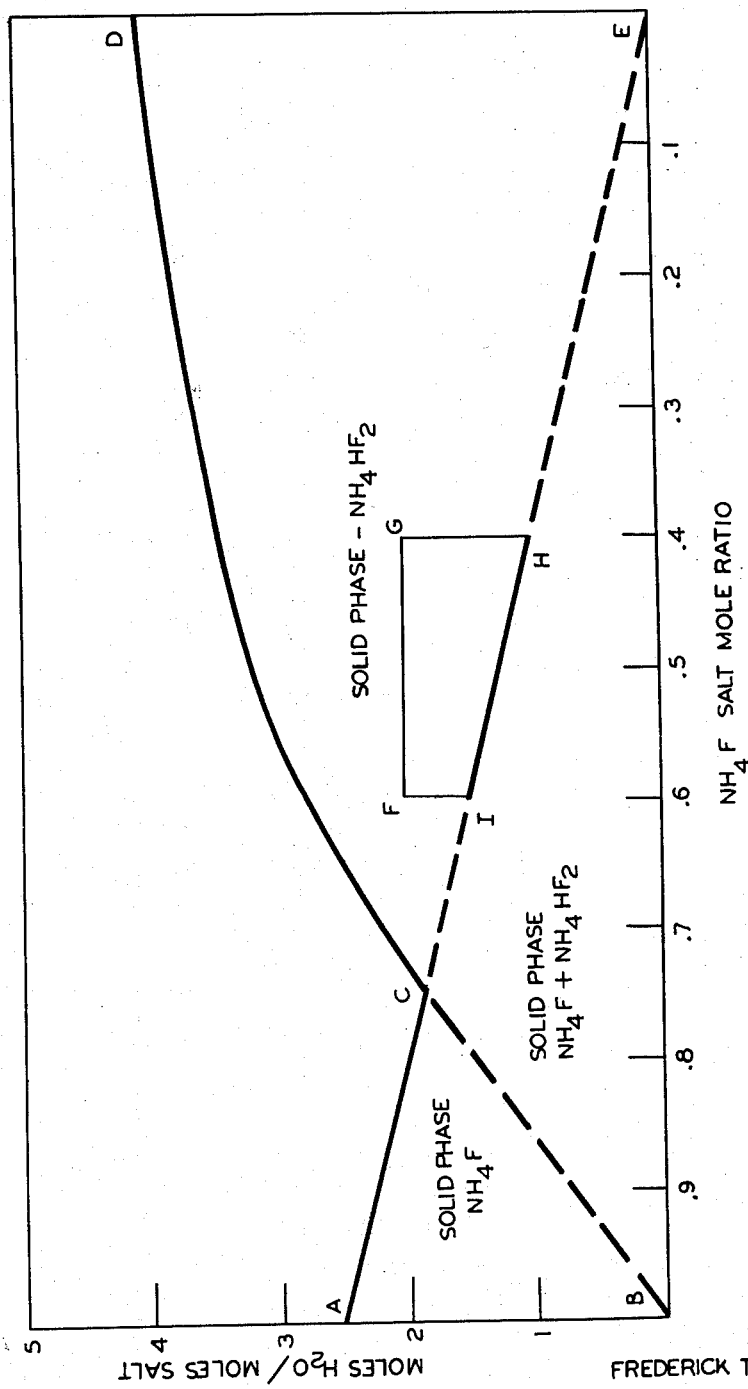

The ammonium bifluoride is crystallized in a routine manner following the data set out in FIGURE 3. Large, pure, anhydrous ammonium bifluoride crystals are obtained in the predicted yield on cooling to ambient temperature, on the order of 25° C., and readily separated from the mother liquor. The crystals may be dried at moderate temperatures. After the crystals are removed, the mother liquor plus small quantities of wash, if necessary, are recycled to the evaporation step. One of the economic advantages of my process is that the ammonia from the evaporation may be recovered and reused by contacting it with fluosilicic acid in neutralization. This recovery greatly reduces the ammonia required for ammonium fluoride preparation. This reaction results in the preparation of ammonium fluoride and silica. The silica is easily removed by filtration and the ammonium fluoride is fed to the evaporator. This process gives an economical method of utilizing the hydrofluosilicic acid which is a by-product of fertilizer manufacture.

Figure 4:
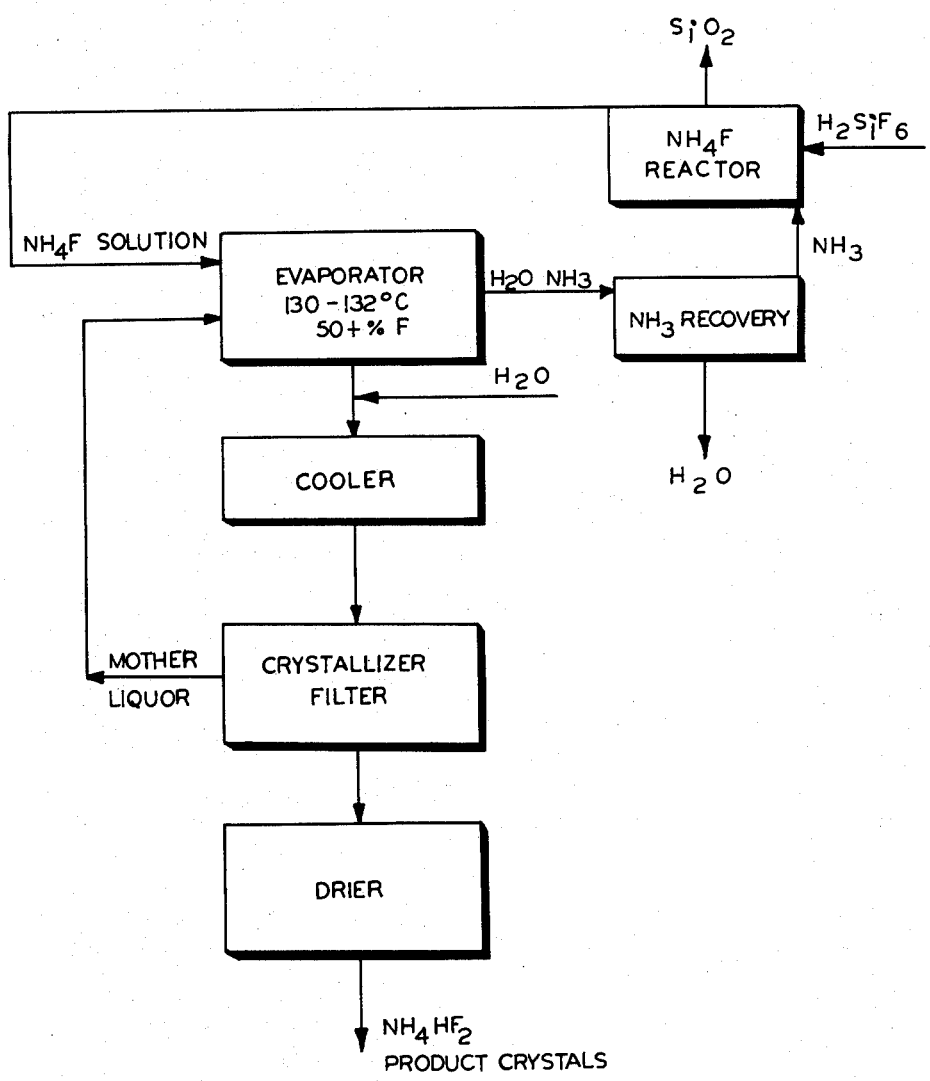

The process of my invention is shown in graphic form in FIGURE 4. This figure shows a typical run in which the evaporator was operated at a temperature of 130° to 132° C. and the evaporation solution contained 50% fluoride as salts. The simplicity of the system is readily apparent from an examination of FIGURE 4. The salt solution containing ammonium fluoride is added to the evaporator maintained at this temperature. Maintenance of this temperature is extremely important because it is the basis on which the cyclic operation of the process depends. As pointed out previously, the temperature of operation of the evaporator depends on the salt concentration and serves to control the evaporator solution compsition. The solution removed from the evaporator is passed through a cooler and then a crystallizer filter. The mother liquor from the filter is continuously recycled to the evaporator and sufficient ammonium fluoride solution is added continuously to maintain evaporator temperature and keep the concentration of fluoride at 50%. In other cases both the temperature and the fluoride can be varied over the ranges set out in the specification. The material from the crystallizer filter is dried and the pure ammonium bifluoride product crystals are recovered. Another important point is the utilization of the water-ammonia solution to prepare the ammonium fluoride which is fed into the evaporator. This is also shown in FIGURE 4. The invention is further illustrated by the following specific but non-limiting examples.

Example I

The operation of the continuous cyclic process is demonstrated in the following example. A 20% ammonium fluoride solution was prepared with 96 grams of water and 24 grams of ammonium fluoride. The ammonium fluoride solution and corresponding recycle mother liquor (27 grams of water, 11.6 grams of ammonium bifluoride, and 17.6 grams of ammonium fluoride) were slowly added to the evaporator at rates to maintain an operating temperature of 132° C. During this addition, the distillate was 120 grams of 4.6 ammonia solution. The incremental evaporating solution was removed during the addition and amounted to 8.4 grams of water, 30.0 grams of ammonium bifluoride, and 17.6 grams of ammonium fluoride. The removed evaporating solution was diluted with 18.7 grams of water, cooled to room temperature, and 18.4 grams of pure ammonium bifluoride recovered by crystallization. The crystallization mother liquor corresponded in quantity and composition to the initial portion and was subsequently recycled.

Example II

The purity of the product ammonium bifluoride, that may be obtained by the evaporation-crystallization process using fluosilicic acid from fertilizer waste fluoride gases, is demonstrated in the following example: Commercial fluosilicic acid from waste gases was neutralized with ammonia to prepare a stock ammonium fluoride solution of 947 grams containing 10.08% ammonia and 12.04% fluoride. A concentrated solution of similar origin, containing 700 grams of ammonium fluoride, 359 grams of ammonium bifluoride, and 941 grams of water was heated to boiling and evaporated with stirring. The volume during evaporation was maintained constant by the slow addition of the ammonium stock solution. On completing the addition, the solution was cooled to room temperature and the large white crystals of ammonium fluoride removed by filtration on a Buchner funnel with prolonged suction and packing of the crystals to remove mother liquor. The crystals, after drying at 70° C., had the following analysis:

|  | Percent | Calculated as ammonium bifluoride, percent |
| --- | --- | --- |
| Ammonia | 29.84 | 100 |
| Fluoride | 66.20 | 99.3 |
| Bifluoride (by titration) | 34.60 | 98.6 |

It is apparent from an examination of this data that the ammonium bifluoride recovered was essentially pure and that very little washing is needed to remove the mother liquor that might contaminate the product.

Obviously many modifications and variations of the invention as hereinabove set forth may be made without departing from the essence and scope thereof and only such limitations should be applied as are indicated in the appended claims.

What is claimed is:

1. A cyclic process for converting an ammonium fluoride solution to crystalline ammonium bifluoride which comprises evaporating a solution of ammonium fluoride and ammonium bifluoride at a concentration in the range of 44 to 50 weight percent fluoride and a salt mol fraction of 0.47 to 0.60 at a constant temperature in the range of 125 to 135° C. in an evaporating vessel to remove ammonia and water, continuously removing a portion of the concentrated solution and separating pure crystalline ammonium bifluoride crystals by cooling to a temperature of about 25° C., continuously recycling the mother liquor from the crystallization to the evaporating vessel, and continuously adding the ammonium fluoride solution to be converted to the evaporating solution at the rate necessary to maintain a constant evaporating temperature, drying and recovering pure ammonium bifluoride crystals as a product.

2. A cyclic process for converting an ammonium fluoride solution to crystalline ammonium bifluoride which comprises evaporating a solution of ammonium fluoride and ammonium bifluoride at a concentration of about 50 weight percent fluoride and a fluoride salt mol fraction of about 0.47 at a constant temperature in the range of 130 to 132° C. in an evaporating vessel to remove ammonia and water, continuously removing a portion of the concentrated solution and separating pure crystalline ammonium bifluoride crystals by cooling to a temperature of about 25° C., continuously recycling the mother liquor from the crystallization to the evaporating vessel, and continuously adding ammonium fluoride solution to be converted to the evaporating solution at the rate necessary to maintain constant evaporating temperature, drying and recovering pure ammonium bifluoride crystals as a product.

References Cited in the file of this patent
UNITED STATES PATENTS 2,780,522    Gloss et al.    Feb. 5, 1957
3,005,684    Riedl et al.    Oct. 24, 1961